March 2, 1926.

T. BULL 1,575,147

LIGHT CONTROLLING DEVICE

Filed Nov. 17, 1924

INVENTOR
Thomas Bull
BY John A. Naismith
ATTORNEY

Patented Mar. 2, 1926.

1,575,147

UNITED STATES PATENT OFFICE.

THOMAS BULL, OF NEAR SANTA CLARA, CALIFORNIA.

LIGHT-CONTROLLING DEVICE.

Application filed November 17, 1924. Serial No. 750,382.

*To all whom it may concern:*

Be it known that I, THOMAS BULL, a citizen of the United States, and residing near Santa Clara, in the county of Santa Clara and State of California, have invented certain new and useful Improvements in Light-Controlling Devices, of which the following is a specification.

My invention relates to a means for controlling and dimming the light rays of an artificial light at a point near their source, and particularly to so controlling, confining, directing and dimming the light rays of a head light for motor vehicles as to more or less completely eliminate the blinding glare to which the occupants of another approaching car, or pedestrians, are subjected.

Figure 1:
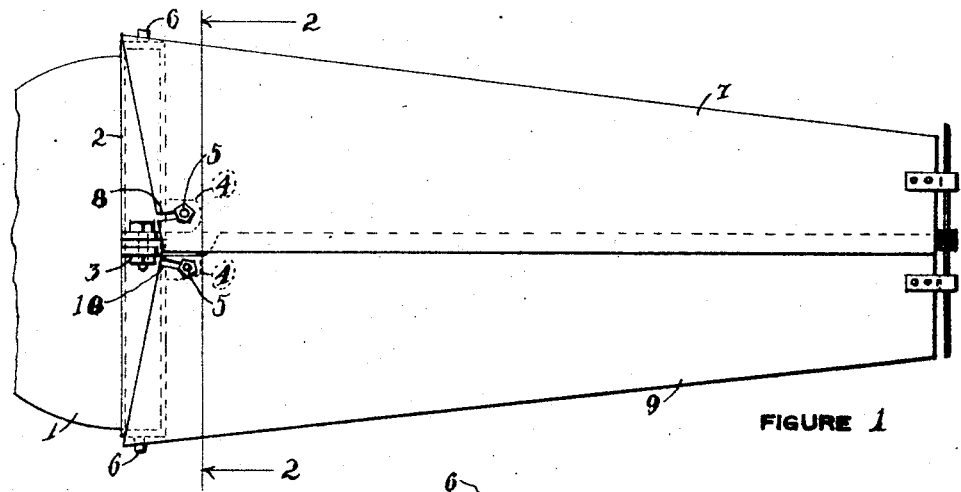
Figure 1 is a side elevation of one embodiment of the invention in position on a motor car headlight.
Figure 2:
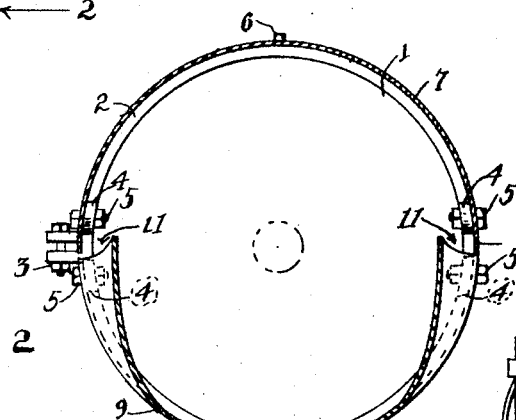
Figure 2 is a sectional view on 2—2 Figure 1.
Figure 3:
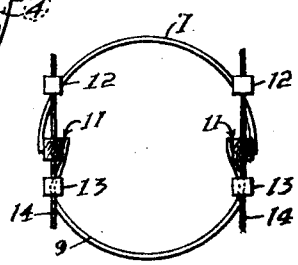
Figure 3 is a front elevation of the device.

Referring more particularly to the drawing, I show at 1 a portion of a standard type of automobile headlight.

At 2 I show a band adapted to fit around the forward edge of the headlight 1 and to be clamped thereon in any suitable manner as at 3. Extending forwardly from the forward edge of band 2 and immediately above and below the horizontal plane bisecting the same, and on each side of said band, are lugs 4 carrying bolts 5. On the upper and lower extremities of said band 2 are pins 6.

At 7 I show a substantially semi-circular and somewhat tapering hood engaging one pin 6 at its larger end and having slots 8 formed therein to engage bolts 5.

At 9 is shown another element formed substantially like hood 7 and engaging bottom pin 6 and provided with slots 10 to engage bolts 5. This lower element 10 is preferably carried inwardly on both edges and upwardly a distance so as normally to overlap the lower edges of hood 7 and spaced a distance therefrom as at 11.

In the present case I have provided the two parts 7 and 9 with oppositely threaded lugs 12 and 13 on their forward ends and placed oppositely threaded rods 14 in engagement therewith so that the forward ends of parts 7 and 9 may be relatively adjusted by turning rods 14 according as more or less light is desired through their forward opening. To secure this adjustment, of course the bolts 5 are loosened, but these bolts are again tightened when the required adjustment is secured.

The parts 7 and 9 are provided with light reflecting inner surfaces and so formed as to intercept almost all of the direct light rays from the headlight 1 and reflect them through such openings as may be provided in or between parts 7 and 9.

In the embodiment above disclosed the space 11 permits a long band of reflected light to be thrown upon the roadway to either side of the machine and enables the driver of an approaching machine to clearly see the forward lower portions thereof such as the front wheels and fenders so that he may accurately judge the necessary clearance.

This device is doubly adjustable, that is, either the upper or lower parts 7 and 9 may be adjusted as desired. It is a dimmer and reflector because it eliminates the glare and throws the light in the most desired direction.

Figure 4:
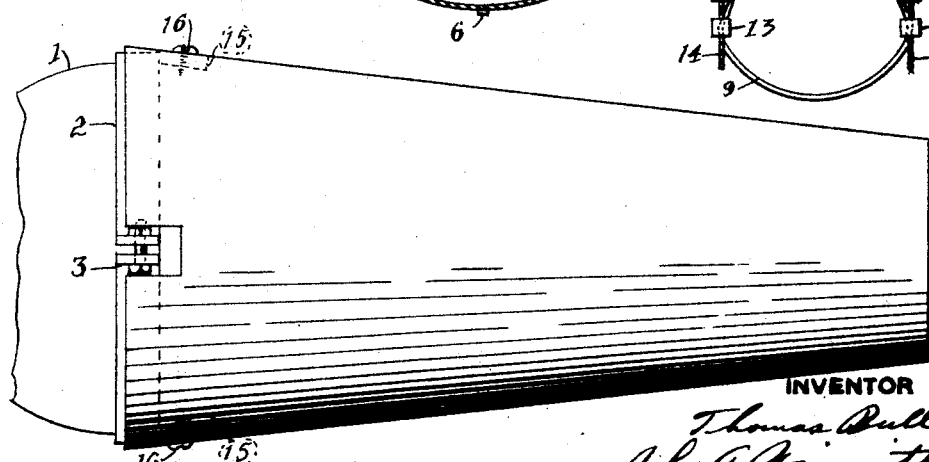
Figure 4 is a side elevation of the preferred embodiment of my invention.

In the preferred embodiment which is shown in Figure 4, I provide the band 2 with lugs 15, one on each side thereof to engage screws 16. In this embodiment the light controlling device comprises one element in the form of a hollow truncated cone having a light reflecting interior surface and secured in position on band 2 by the screws 16. The light may be directed as desired by vertically adjusting the cone and then tightening up the screws 16.

It is to be understood, of course, that while I have herein shown and described two specific embodiments of my invention as applied to an automobile headlight, changes in form, construction, proportions and method of operation may be made within the scope of the appended claims.

I claim:

1. The combination with a source of light and a case therefor, of a light controlling device comprising a hollow truncated cone divided longitudinally into two parts having light reflecting interior surfaces, and means for pivotally mounting each part for vertical adjustment on said case.

2. The combination with a source of light and a case therefor, of a light controlling device comprising a hollow truncated cone divided longitudinally into two parts having light reflecting interior surfaces, the side edges of one part overlapping the side edges of the other part, the overlapping portions being spaced a distance apart as and for the purpose described.

3. The combination with a source of light and a case therefor, of a light controlling device comprising a hollow truncated cone divided longitudinally into two parts having light reflecting interior surfaces, means for pivotally mounting each part for vertical adjustment on said case, and adjusting devices connecting the forward ends of said parts.

THOMAS BULL.